Sept. 22, 1970          A. PITNER          3,529,942
METHOD FOR ASSEMBLING A UNIVERSAL JOINT
Filed April 20, 1967          2 Sheets-Sheet 1
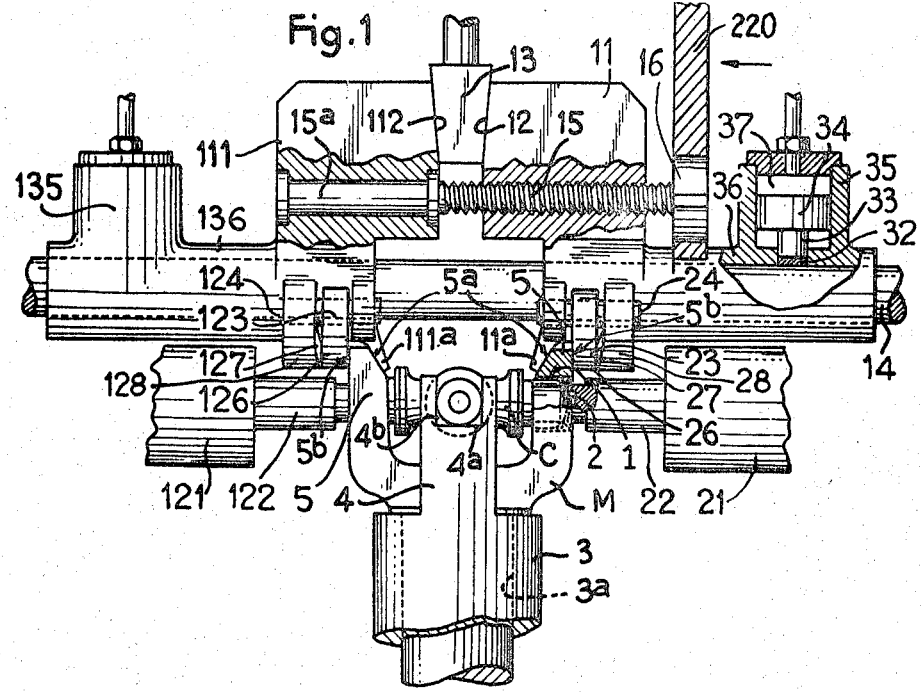
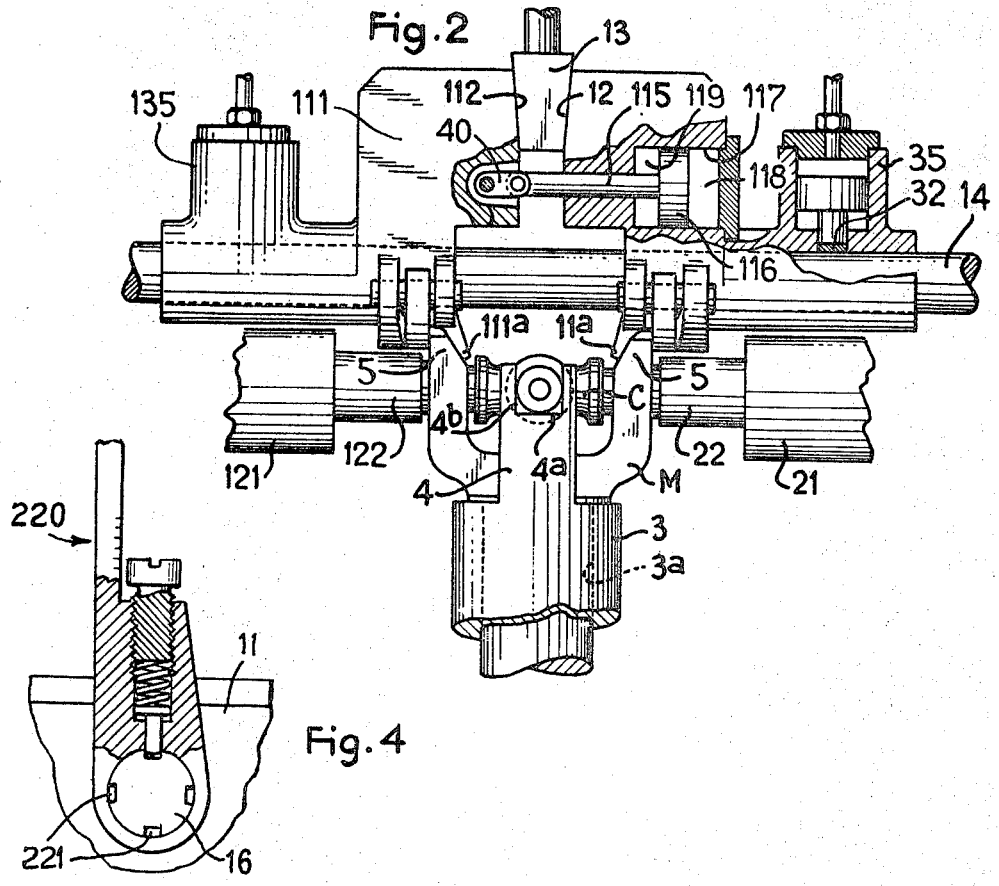

United States Patent Office 3,529,942
Patented Sept. 22, 1970

3,529,942
METHOD FOR ASSEMBLING A UNIVERSAL JOINT
Alfred Pitner, Paris, France, assignor of one-half to S.A.
Nadella, Malmaison, France, a French body corporate
Filed Apr. 20, 1967, Ser. No. 632,334
Claims priority, application France, Apr. 28, 1966,
59,466; Sept. 21, 1966, 77,076
Int. Cl. B23p 19/00
U.S. Cl. 29—434                  5 Claims

ABSTRACT OF THE DISCLOSURE

Method and apparatus for assembling a universal joint, said method comprising elastically deforming the two branches of each fork of the joint, positioning and fixing needle cups in smooth bores of the deformed fork so that the cups cap the journals of the cross member of the joint, releasing the forces which produced the elastic deformation of the branches, the means for deforming the branches being employed independently of the cup positioning and fixing means, by exerting on the branches a force of a predetermined magnitude for spreading them apart or moving them towards each other so as to create, after release of said force, a thrust of the end walls of the cups against faces of the journals of a definite value.

---

The present invention relates to the assembly of universal joints comprising cups which usually have needles, cap the journals and are fixed in the smooth bore of forks connected to shafts or other transmission elements.

One of the problems met with by constructors of universal joints is to avoid the necessity of machining reference surfaces of high precision, which in any case are liable to result in wide variations as concerns off-centre or concentricity in the final assembly owing to the addition of the tolerances of the various parts to be assembled.

Various solutions to this problem have been proposed and in particular the following.

Complementary grooves are provided without precision in each cup and in the corresponding fork bore and a plastic material is injected in the grooves so as to hold the cups stationary relative to the forks.

The desired position in the bore for the cups, or the elements retaining the latter, or auxiliary reinforcement elements, is fixed by means of projections formed from the metal of the bore.

According to the teaching of the U.S. Pat. No. 3,062,026, the retaining element cuts in the required region of the bore hollow or projecting portions which hold it in position, this retaining element performing the treble function of an abutment for the cup, reinforcement for the end wall of the latter and the tool for retaining it in the bore.

Good performance of the universal joints constructed in accordance with any of these methods in practice requires that a negative clearance, that is, a certain tight fit or clamping be provided when assembling between the ends of the cups and the end faces of the journals of the cross member.

For this purpose, an apparatus has been proposed which permits, after a reciprocal centering between the two shafts and the cross member, positioning the end walls of the cups against the end faces of the journals of the cross member independently of the length of the journals and of the thickness of the branches of the fork by pressing, until contact is achieved, each cup against the journals in the bore of the branch of the fork so that the reaction force resulting from the positioning pressure is exerted in the opposite direction on the branch of the fork which is elastically moved away an adjustable amount in the direction opposed to the direction of pressing.

This method has the drawback of adjusting by determining the extent of the separation of the branches of the fork, which adjustment in normal mass-production is fixed once and for all for each production batch and consequently cannot take into account, first, variations in the elasticity due, for example, to variations in shape resulting from forging or foundry tolerances or in any case to variations in shape from one type of fork to another which does not permit changing from one type of part to another unless the adjustment is modified and, secondly, variations in the materials (for example some forks are of steel and others of iron) which can be the cause of wide variations in the results obtained.

According to the known solution, the adjustment based on the separation of the branches of the fork (whose drawbacks have just been mentioned) is an obligation related to the utilisation of the force of reaction resulting from the pressure exerted on the cups, which gives a force determined by the force required for this positioning, this force not being necessarily of the same magnitude as the force necessary for spreading apart the branches of the fork.

Further, this adjustment of the distance between the branches must necessairly be effected with reference to the support and therefore only small variations can be tolerated. This can lead to erratic results in the course of the assembly of the same batch or series of parts if frequent checking is not effected.

The U.S. Pat. No. 3,290,754 also described means for elastically spreading apart the branches of a fork for obtaining a negative clearance between the journals of a universal joint and the corresponding cups, but these means also define the negative clearance or the tightness by the extent of the deformation of the branches, that is, by a measurement of length, so that the result obtained has the same drawbacks as those mentioned hereinbefore.

Experience has shown that in order to obtain the required final tension which corresponds in fact to a spreading of the branches of the fork, in the parts assembled in their final state, it is in some cases necessary to effect initially an operation for moving the branches towards each other instead of spreading them apart, depending on the relative rigidity of the parts.

This is due to the diversity of the forces employed, which produce elastic or permanent deformations both in the elements of the apparatus employed and in the parts to be assembled.

The object of the invention is to provide a method of assembling a universal joint comprising cups which have, for example, needles, cap the journals of a cross member and are fixed in a smooth bore of forks connected to shafts or other transmission elements, said method comprising elastically deforming the two branches of each fork, positioning and fixing the cups in the bores of the deformed fork, releasing the forces which produce the elastic deformation, the means for defroming the branches of the fork being employed independently of the cup-positioning and fixing means, in the known manner, by exerting on the branches a force for spreading them apart or moving them towards each other of a given magnitude so as to create, after the release of this force, a thrust of the end walls of the cups against the faces of the journals which has a definite value.

In this way, the rubbing torque of the end walls of the cups on the ends of the journals in the universal joint is also definite so that the joint operates with a remarkable regularity.

The choice of the force for spreading the branches apart or moving the latter towards each other as the magnitude of the adjustment and not the extent of the deformation, results in variations in the extent of this deformation due to variations in the elasticity of the branches of the forks, but these variations are automatically compensated when the force applied is released with the result that the initial centering of the parts to be assembled is unaltered.

The force for spreading the branches apart or moving the branches towards each other is determined once and for all in accordance with the elasticity of the forks and of the other parts which undergo a deformation and also in accordance with the rubbing torque to be obtained.

The branch gap spreading or narrowing means employed for carrying out the method according to the invention act independently of the supports supporting the cup-fixing means. For example, depending on whether the moving elements which produce the deformation of the branches of the fork are controlled by a screw, a single-acting jack or a double-acting jack, the constant deforming force is obtained by means of a dynamometric wrench, the inlet pressure of the jack or by the feeding the two jacks in parallel under the same pressure.

The two bearing points of the independent system are constituted by the ends of the fork which support indifferently what can be considered the action and reaction of the system, namely equal and opposite forces.

However, in view of the fact that the moving elements of the branch gap spreading or narrowing means must withstand—while maintaining the deformation corresponding to the applied force—the cup positioning and fixing forces which, as mentioned hereinbefore, may not be of the same magnitude, these elements must be locked in position relative to the support both for maintaining the deformation achieved and for avoiding any substantial deformation of the fork which could result from an action (which is not exactly simultaneous) of the positioning presses acting on the two opposed cups. A wedge device giving this result is described in the aforesaid U.S. Pat. No. 3,290,754.

However, such a device has been shown to be insufficient, since the considered state of equilibrium, before the positioning of the wedge or wedges, implies that the resultant of the forces is nil and the mere introduction of the wedge or wedges creates unbalanced forces which might be small but which often destroy the previously-achieved equilibrium of the system.

This is why, in accordance with the invention, the locking means are combined with braking means adapted to cancel out the forces which might have been produced by the locking means.

Further features and advantages of the invention will be apparent from the ensuing description with reference to the accompanying drawings.

In the drawings:

FIG. 1 is an elevational view, with parts in section, of a mechanical fork-deforming system;

FIG. 2 is a view similar to FIG. 1 of a hydraulic fork-deforming system, and

FIG. 4 is a partial elevational view in the direction of the arrow of FIG. 1.

Figure 3:
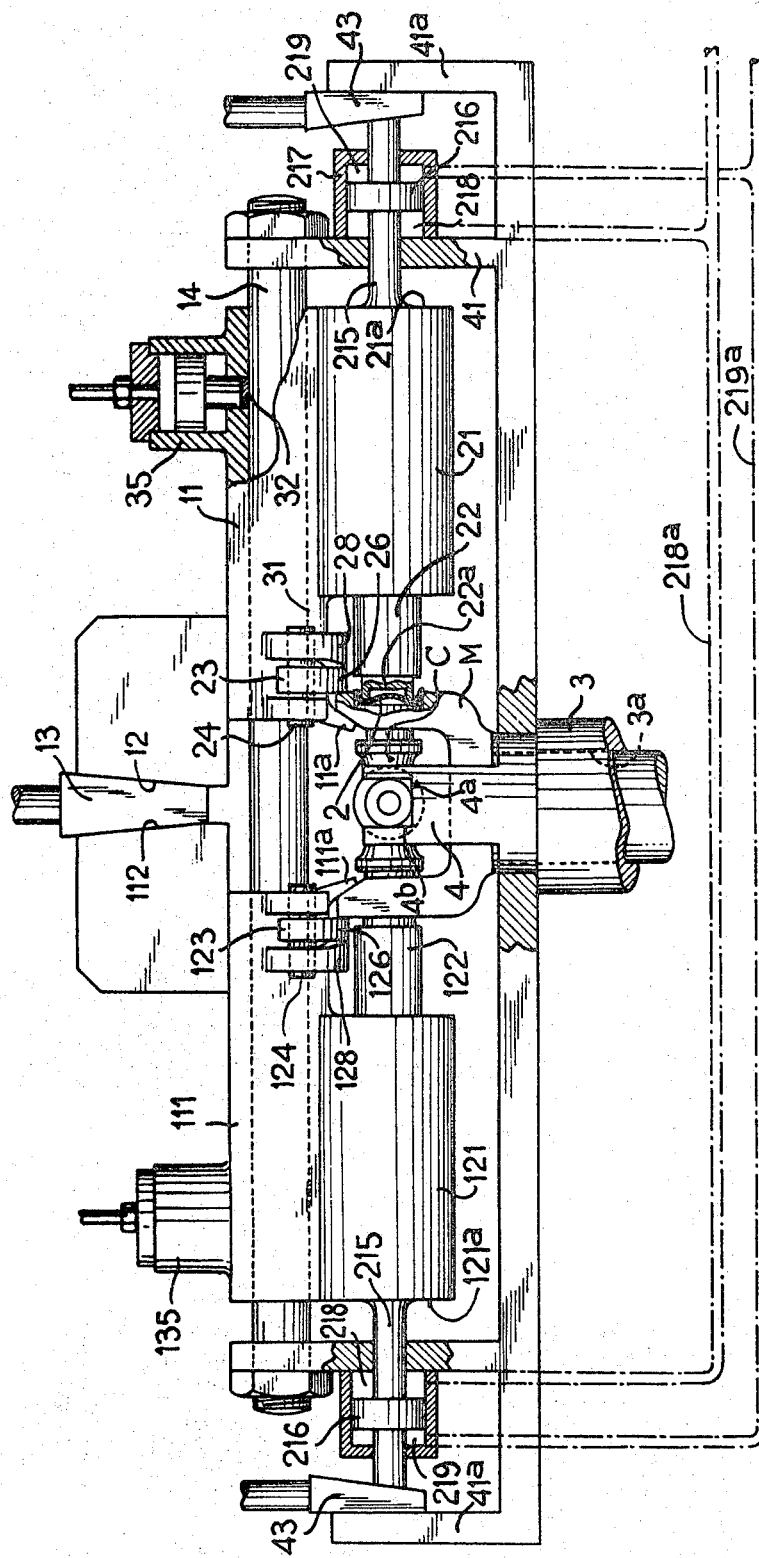
FIG. 3 is a view similar to FIG. 1 of a hydraulic fork-deforming system associated with a system for positioning the cups whose action is independent of the fork-deforming system.

All the figures concern by way of an example the maintaining of cups 1 and elements 2 for fixing the latter interposed between a cross member C and a fork M. The fork and the cross member are held centered relative to each other by means of a device comprising, for example, a collar 3 which receives in its bore 3a the stem of the fork M and has on either side of the plane of the figure two projections 4 having a horizontal face 4a for regulating the position of the parts C and M in height and two vertical faces 4b for ensuring the crossing of the horizontal axis of the corresponding pair of journals and the vertical axis of the fork M as described in the U.S. patent application No. 617,129 filed on Feb. 20, 1967.

Mandrels 22, 122 for positioning and fixing the cups 1 and the retaining elements 2 are shifted by cylinders 21, 121 in the known manner.

Slidable on a guide rod 14 which is connected to the support and parallel to the line of action of the mandrels 22, 122, are two blocks 11 and 111 each of which comprises, first, a rigid projection 11a or 111a which is adapted to be applied against the inner face 5a of the corresponding branch 5 of the fork M, and secondly, a movable member 23 or 123 which is pivotable and slidable on a pin 24 or 124 on the block 11 or 111 and so shaped that the lower part 26 or 126 can be wedged between the outer face 5b of the corresponding branch 5 of the fork M and the helical face 27 or 127 formed on a portion 28 or 128 depending from the block 11 or 111.

The block 11 has a screwthread receiving a screw 15 which is actuated by means of a dynamometric wrench (not shown) acting on a head 16 which has a recess and is integral with the screw 15. The smooth end portion 15a of this screw is disposed in the known manner in the block 111 to rotate freely without any axial movement. Depending on whether the head 16 is rotated in one direction or the other, the branches 5 of the fork M are spread apart by the projections 11a, 111a applied against the inner faces 5a, or moved towards each other due to the thrust exerted by the lower portion 26 or 126 of the member 23 or 123 in contact with the outer faces 5b of the branches 5.

This deformation, which is maintained within the elastic range, occurs under a given load or force determined by the rating of the dynamometric wrench with no reference to the fixed points outside the system, except of course the guiding of the blocks on the rod 14 in a direction parallel to their movements.

On the whole, the system comprising the two blocks 11, 111 and the deformed fork M is in a state of equilibrium which must be insensitive to the action of the forces subsequently employed when positioning and fixing the retaining elements 2 of the needle cups 1. For this purpose, the blocks 11 and 111 have faces 12 and 112 which are inclined at an angle less than the angle of friction, the spacing between these faces at the end of travel being maintained by the introduction of a wedge 13.

It is also necessary that the forces possibly set up by this wedge 13 do not themselves affect the state of the equilibrium. This is why means for braking the movable assembly 11, 111 must be provided for precluding any displacement and be applied before the wedge is placed in position. In the illustrated embodiment, these means consist of friction pads 32, 132 which are adjacent the rod 14 and disposed at the end of a rod 33 of a piston 34 which is movable by a hydraulic fluid in a cylinder 35, 135 which is formed on, or fixed to, an extension 36, 136 of the block 11 or 111. It will be clear that the supply of fluid to the pressure chamber 37 results in the desired braking action.

The wedge 13 can be shifted, with no other reference to the support other than the bearing point of a control cylinder (not shown) acting on this wedge. Instead of a single wedge, two wedges could be provided which are shifted by two means such as hydraulic pistons connected to the support and co-operate separately with the inclined face 12 and 112 respectively so as to subsequently produce a reaction of sufficient magnitude in the course of positioning of the cups to the force which is exerted by each of the mandrels 22, 122 and transmitted by each branch of the fork M to the projections 11a and 111a, or to the members 23, 123, without this system being considered to intervene in the deformation of the fork and in the independence of the means achieving this deformation with respect to this support.

In FIG. 2 a rod 115 has a free end connected to the block 111 at 40 and is actuated by a piston 116 which moves inside a cylinder 117 to which oil can be supplied in either of two chambers 118, 119 located on each side of the piston 116. The action of the rod 115 and of the piston 116 is comparable to that of the screw 15 described hereinbefore, the pressure of the oil determining the force for widening or narrowing the gap between the branches 5 of the fork. The locking device, including the wedge 13 and the device for braking the movable assembly 11, 111 by means of the friction pads 32, 132, are identical to those shown in FIG. 1.

FIG. 3 shows a system which can be considered as a modification of that shown in FIG. 2. The two cylinders 21, 121 actuating the cup-positioning mandrels 22, 122 are connected to the movable blocks 11, 111 respectively. Fixed to each cylinder end 21a or 121a is a rod 215 integral with a piston 216 which is guided in a cylinder 217 fixed to, or formed on, the support 41. By supplying oil to the chamber 218 of each of the two cylinders 217, the branches of the fork are spread apart. By supplying oil to the chambers 219 opposed to the chambers 218 the branches are moved towards each other. Two feed conduits 218a, 219a are respectively connected to the chambers 218 and the chambers 219 so that a force determined by the oil pressure in the chambers 218 or 219 is applied to the branches of the fork M through the projections 11a, 111a or the members 26, 126. The fork M is locked in the corresponding deformed position by the wedge 13 inserted between the two blocks 11, 111 and by two wedges 43 disposed between the free end of the piston rods 215 and an associated support surface 41a formed on the support 41.

The embodiment shown in FIG. 3 clearly shows how the deforming means are employed independently of, first, the cup-positioning and fixing means 21–121 and, secondly, the support 41. It is clear that the action of the expanding projections 11a, 111a or the gap-narrowing members 23, 123 takes place, first, without any support point on the support 41, other than the support of the liquid supplied to the chambers 218 (or 219) which are balanced, secondly, independently of the action of the cylinders 21 and 121 which are at rest during this stage of the operation and, thirdly, without possible reaction on the part of these cylinders 21 and 121 in the subsequent stage for positioning the cups since the deforming means are locked in position by the wedge 13 and the two wedges 23 which prevent any movement, apart from elastic deformation of the various parts.

The braking means which must exert no reaction in the direction axially of the guide rods 14 and have such intensity that the axial component due to the positioning of the wedge 13 or wedges 43 cannot vary their position, could, in the embodiment shown in FIG. 3, consist of pads connected to the support, similar to the illustrated pads 32 and acting on the elements 11, 21, 215, or 111, 121, 215 or on elements integral with these elements in contact with surfaces parallel to the axis of the rod 14, for example on the periphery of the cylinders 21, 121, with a maximum coefficient of friction so that no axial component arises and the transverse forces possibly set up are as low as possible.

Although specific embodiments of the invention have been described, many modifications and changes may be made therein without departing from the scope of the invention as defined in the appended claims.

There should be mentioned, by way of a modification an arrangement which does not employ additional means, such as the pivotable members 23, 123 and which is particularly applicable to the embodiment shown in FIG. 3. The function of the member 23 or 123 in FIG. 3 can be performed by the centre part 22a of the mandrel 22 which pushes the retaining element 2 into position. In a first stage, instead of pushing the element 2 to its final position, a reduced pressure is employed which applies a force through the element 2, on the outer face 5b of the branch 5 of the fork M while the reaction of the cylinder 21 applies a force through the part 31 and the projection 11a which is equal and opposite on the corresponding branch of the fork M. Thus, in this first stage, this branch, and consequently each branch of the fork M, is pinched without clearance and without exterior force. Henceforth, a compression under a given load can be effected in a second stage by acting not on the chamber 218 of the cylinder 217 but on the opposite chamber 219.

Having now described my invention what I claim as new and desire to secure by Letters Patent is:

1. In a method for assembling a universal joint comprising a cross member, two forks each having two branches and bearing cups which have end walls and contain rolling elements and are adapted to cap the journals and be fixed in smooth bores having axes in the forks in the assembled joint, and said method comprising elastically deforming the two branches of each fork by exertion of a predetermined first force on said branches in a direction substantially parallel to said axes by first means, locking the branches of the fork in the deformed condition by locking means, positioning and fixing the cups in the bores of the deformed fork by exertion of a second force on said cups by second means, releasing said locking means so as to release the branches of the fork and allow the branches to resume their initial position; the feature that said first means are independent of said second means so that the magnitude of said first force can be freely chosen with no regard to the magnitude of said second force, the magnitude of said first force measured along the axes of said bores being chosen to result in the thrust required to be exerted by said cup end walls along said axes on said journals in the assembled joint, and said branches being allowed freedom of movement along said axes throughout exertion of said first force, the extent of the elastic deformation of said branches being of no consequence.

2. A method as claimed in claim 1, wherein said first means comprise a screw associated with movable elements adapted to act on the branches, and said first force is determined by means of a dynamometric wrench acting on said screw.

3. A method as claimed in claim 1, wherein said first means comprise branch-engaging movable elements and a hydraulic device controlling the position of said movable elements, the magnitude of said first force being determined by the pressure of the fluid fed to said hydraulic device.

4. A method as claimed in claim 1, wherein said first means comprise two hydraulic devices, branch-engaging movable elements controlled by said hydraulic devices, said first force being exerted by feeding the hydraulic devices in parallel at a given pressure.

5. A method as claimed in claim 1, wherein said first means comprise branch-engaging movable elements and said locking means comprise wedge means cooperative with said movable elements for locking said movable elements in the position for maintaining the deformation of said branches, braking means being provided and associated with said movable elements for braking said movable elements, said movable elements being braked by said braking means, prior to locking said movable elements with said wedge means, in such direction that the braking force has no component capable of affecting the deformed position of said branches.

References Cited

UNITED STATES PATENTS

| | | | |
|---|---|---|---|
| 2,238,335 | 4/1941 | MacGregor | 29—438 |
| 2,976,091 | 3/1961 | Miller. | |
| 3,062,026 | 11/1962 | Pitner. | |
| 3,178,907 | 4/1964 | Lyons. | |
| 3,218,692 | 11/1965 | Kayser. | |
| 3,230,617 | 1/1966 | Spiess et al. | 29—434 |
| 3,290,754 | 7/1966 | Pitner | 29—33 |

JOHN F. CAMPBELL, Primary Examiner

B. A. ADAMS, Assistant Examiner

U.S. Cl. X.R.

29—464